United States Patent
Tucker, Sr.

(10) Patent No.: US 7,416,499 B2
(45) Date of Patent: Aug. 26, 2008

(54) SPORTS EQUIPMENT HANDLE

(75) Inventor: Richard B. C. Tucker, Sr., Ruxton, MD (US)

(73) Assignee: STX, LLC, Baltimore, MD (US)

( * ) Notice: Subject to any disclaimer, the term of this patent is extended or adjusted under 35 U.S.C. 154(b) by 0 days.

(21) Appl. No.: 11/052,246

(22) Filed: Feb. 8, 2005

(65) Prior Publication Data

US 2005/0137037 A1    Jun. 23, 2005

Related U.S. Application Data

(60) Continuation of application No. 10/274,388, filed on Oct. 21, 2002, now Pat. No. 6,960,144, which is a division of application No. 09/706,831, filed on Nov. 7, 2000, now Pat. No. 6,500,079.

(51) Int. Cl.
*A63B 59/02* (2006.01)
*A63B 65/12* (2006.01)

(52) U.S. Cl. .................... 473/513; D21/724

(58) Field of Classification Search ........ 473/513, 473/512, 505; D21/724
See application file for complete search history.

(56) References Cited

U.S. PATENT DOCUMENTS

| | | | | |
|---|---|---|---|---|
| 805,132 A | | 11/1905 | Gubbins | |
| 1,535,667 A | * | 4/1925 | Horne | 473/303 |
| 1,687,736 A | | 10/1928 | Root | |
| 1,963,057 A | * | 6/1934 | Wilcox | 29/897.33 |
| 2,091,458 A | | 8/1937 | Sleight | |
| 2,099,126 A | * | 11/1937 | Larsen | 156/256 |
| 3,479,045 A | | 11/1969 | Miller | |
| 3,868,110 A | * | 2/1975 | Jones | 473/551 |
| 3,972,529 A | * | 8/1976 | McNeil | 473/320 |
| 4,206,918 A | | 6/1980 | Lewis, Jr. | |
| 4,278,251 A | * | 7/1981 | Lafourcade | 473/521 |
| 4,402,529 A | | 9/1983 | Cavazza | |
| 4,721,021 A | * | 1/1988 | Kusznir | 81/22 |
| 4,912,836 A | | 4/1990 | Avetoom | |
| 4,919,420 A | * | 4/1990 | Sato | 473/203 |
| 4,941,232 A | | 7/1990 | Decker et al. | |
| 4,953,862 A | | 9/1990 | Uke et al. | |
| 5,042,804 A | | 8/1991 | Uke et al. | |
| 5,048,843 A | | 9/1991 | Dorfi et al. | |
| 5,155,878 A | | 10/1992 | Dellis | |
| 5,219,164 A | | 6/1993 | Peng | |
| 5,263,711 A | | 11/1993 | Addis et al. | |
| 5,275,407 A | * | 1/1994 | Soong | 473/549 |
| 5,312,100 A | | 5/1994 | Illacqua et al. | |
| 5,373,616 A | | 12/1994 | Biersdorf et al. | |
| 5,398,369 A | | 3/1995 | Heinzelman et al. | |
| 5,425,534 A | | 6/1995 | Chen | |

(Continued)

*Primary Examiner*—Gene Kim
*Assistant Examiner*—M Chambers
(74) *Attorney, Agent, or Firm*—Paul, Hastings, Janofsky & Walker LLP

(57) ABSTRACT

A variable hand placement sports equipment handle, such as a lacrosse stick handle, hockey stick handle, or field hockey stick handle, that includes a shaft and at least one overlay attached to the shaft at a location of frequent hand placement. The overlays are specially located and structured to provide the shaft with structural and tactile features that correspond to and accommodate the way in which a player moves his hands along the shaft and grips the shaft. The structural and tactile features, such as ribs, grooves, and hourglass and conical shapes, are located on the shaft to enhance a player's control of the shaft when performing various skills.

21 Claims, 9 Drawing Sheets

U.S. PATENT DOCUMENTS

| | | |
|---|---|---|
| 5,431,563 A | 7/1995 | Huybrechts |
| 5,482,993 A | 1/1996 | Hiraoka |
| 5,485,996 A | 1/1996 | Niksich |
| 5,566,947 A * | 10/1996 | Tucker et al. ............... 473/513 |
| 5,603,498 A | 2/1997 | Crawford et al. |
| 5,685,791 A * | 11/1997 | Feeney ....................... 473/513 |
| 5,711,720 A | 1/1998 | Janes et al. |
| 5,766,720 A | 6/1998 | Yamagishi et al. |
| 5,772,541 A | 6/1998 | Buiatti |
| 5,810,682 A | 9/1998 | Carruthers |
| 5,839,983 A | 11/1998 | Kramer |
| 5,951,504 A | 9/1999 | Iglesias et al. |
| 5,960,677 A | 10/1999 | Carmien |
| 5,981,649 A | 11/1999 | Kiraoka et al. |
| 5,991,926 A | 11/1999 | Lakusiewicz |
| 6,237,193 B1 | 5/2001 | Skerker et al. |
| 6,270,134 B1 | 8/2001 | Lin |
| 6,500,079 B1 * | 12/2002 | Tucker, Sr. .................. 473/513 |
| 6,752,730 B1 * | 6/2004 | Brine et al. ................. 473/513 |
| 6,960,144 B2 * | 11/2005 | Tucker, Sr. .................. 473/513 |
| 2003/0228929 A1 * | 12/2003 | Miyasu et al. ............. 473/300 |

* cited by examiner

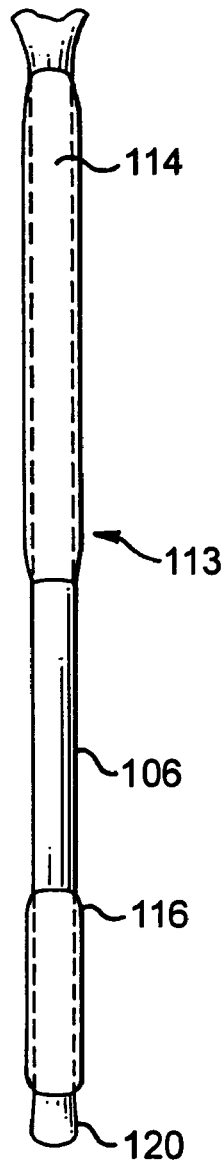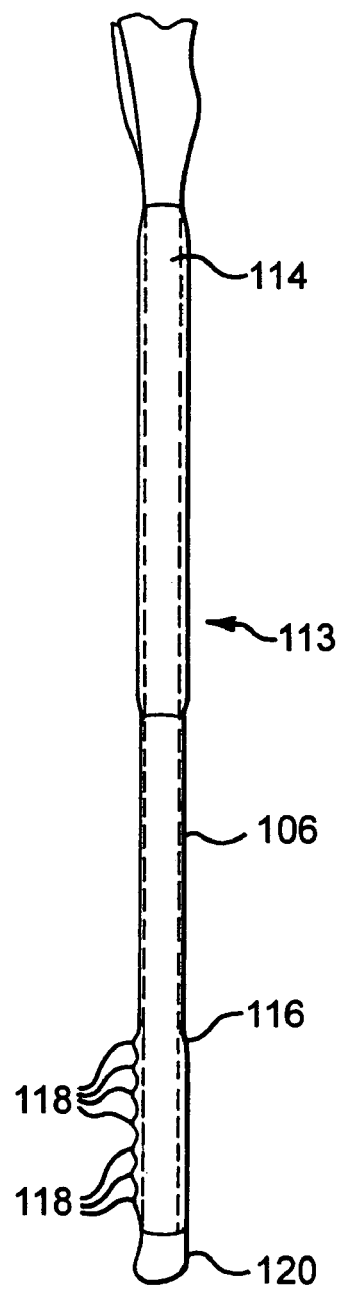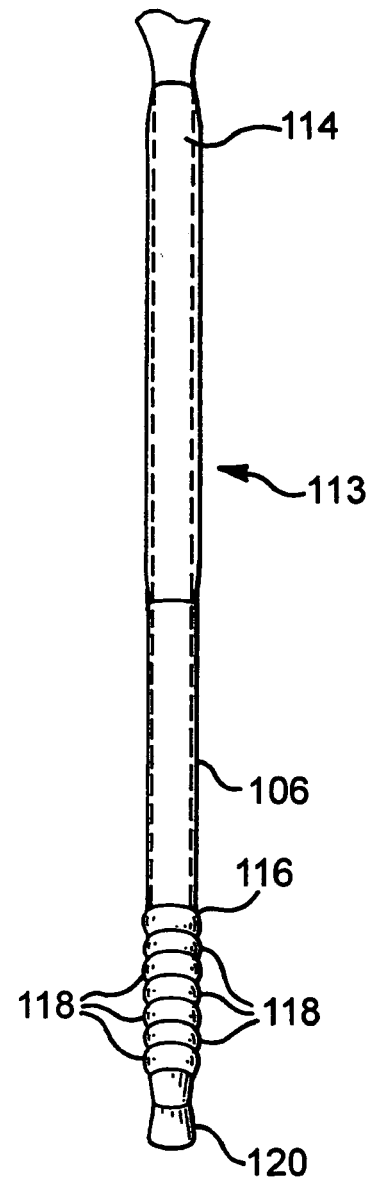
FIG.1d  FIG.1e  FIG.1f

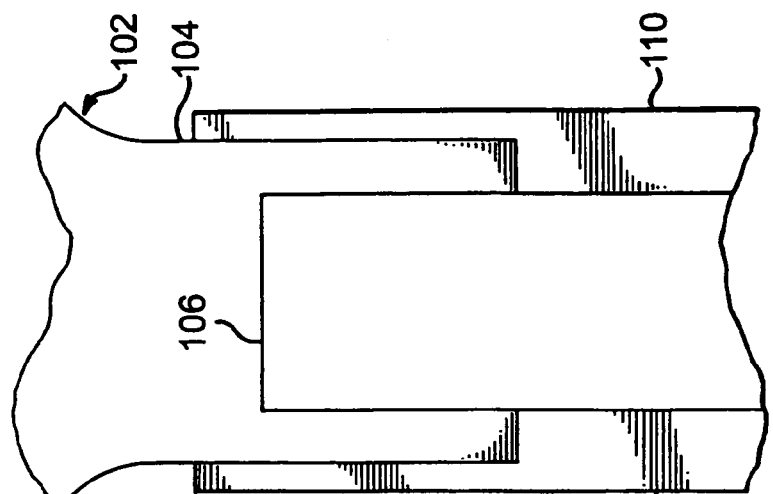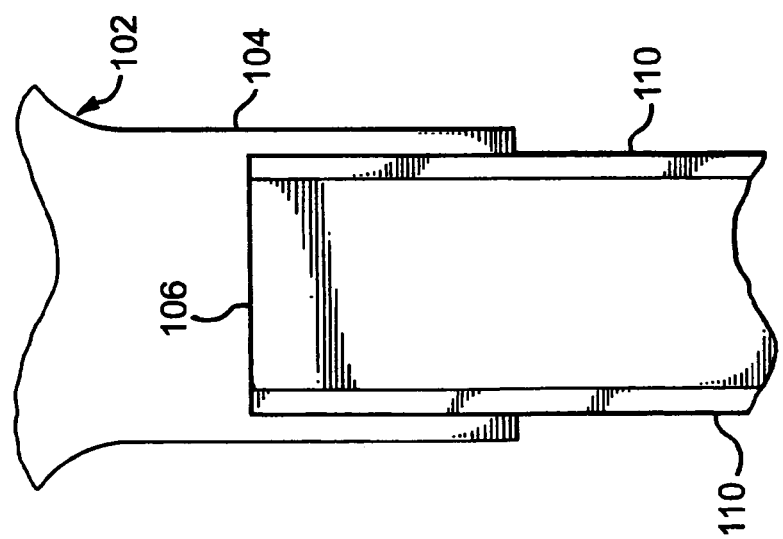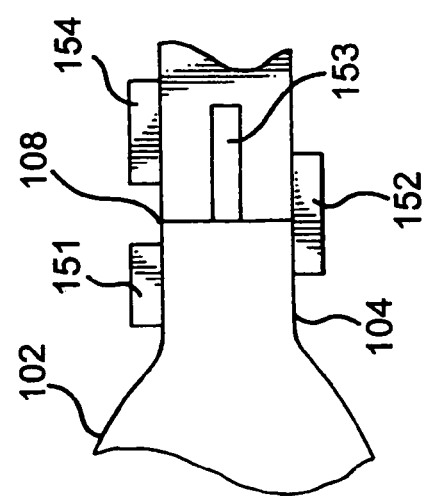

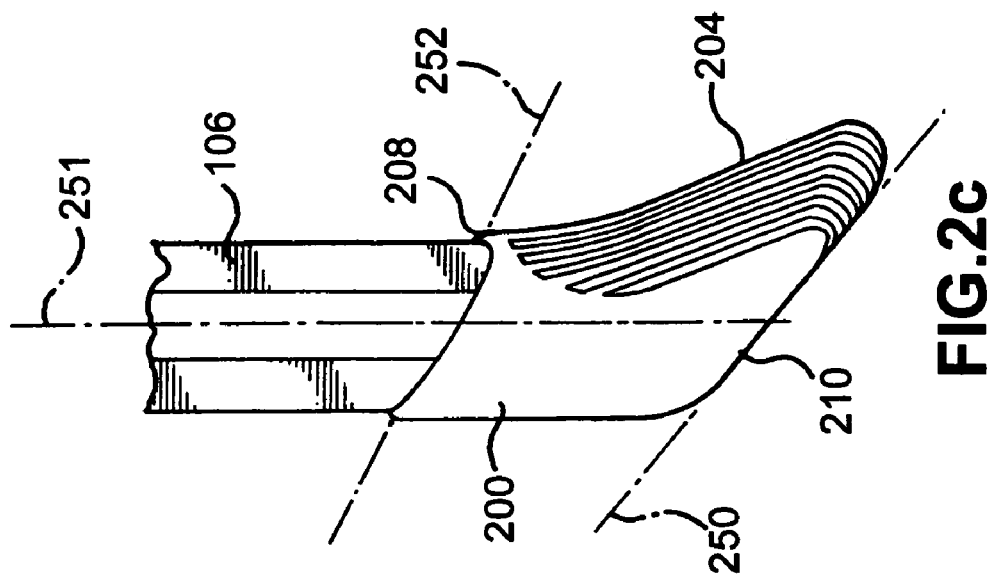
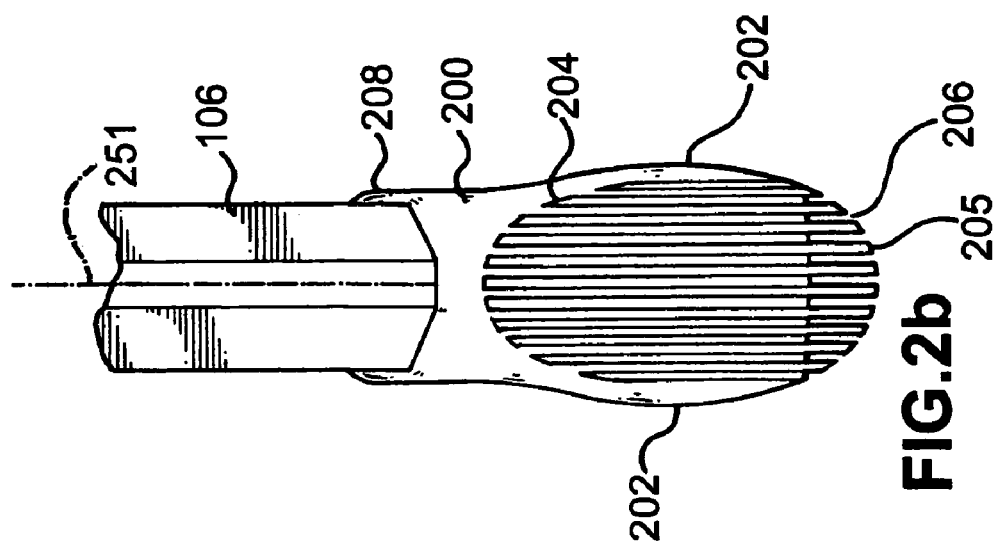
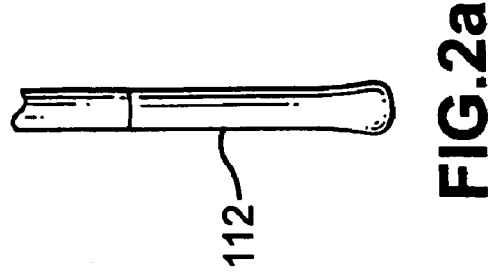

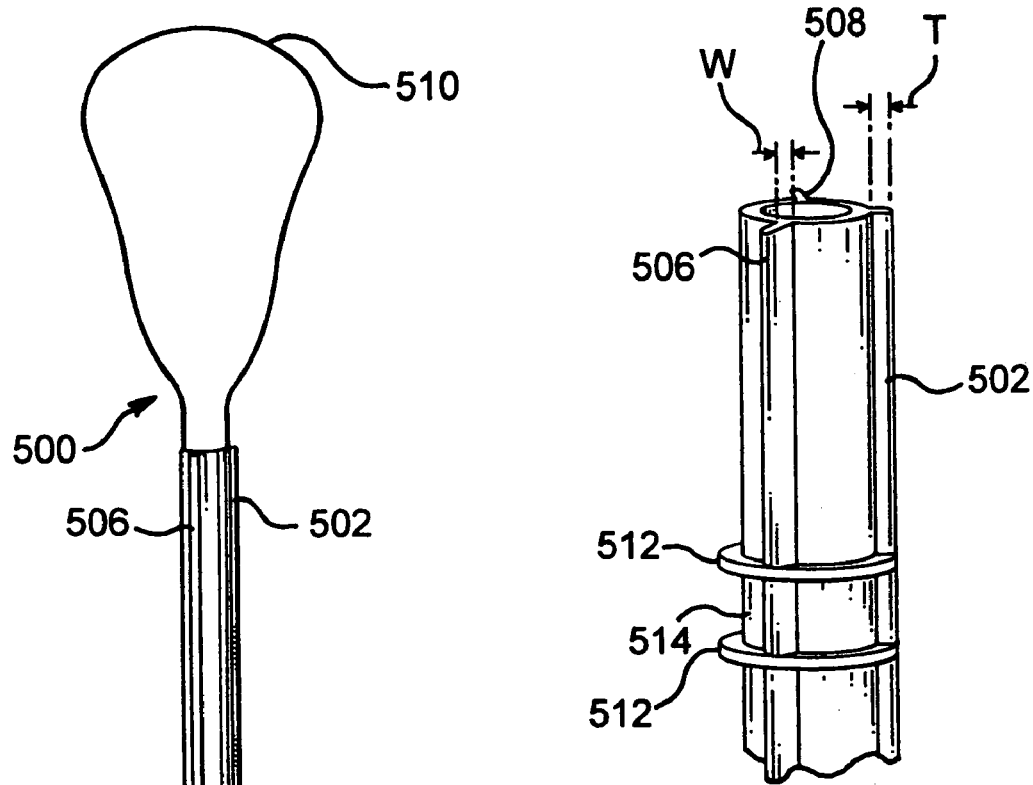
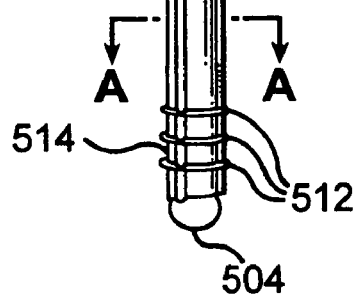
FIG.5
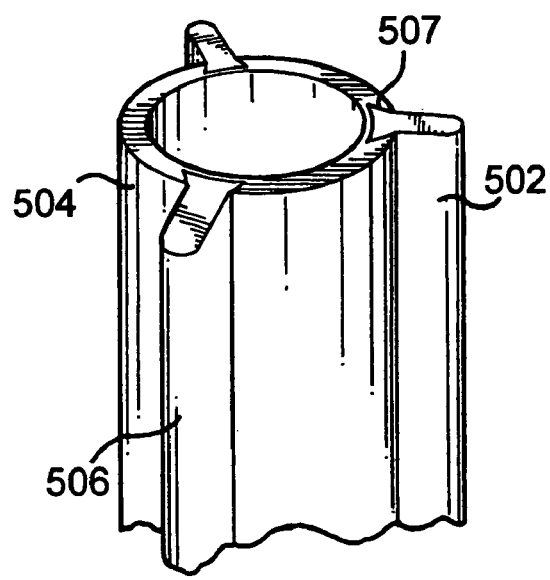

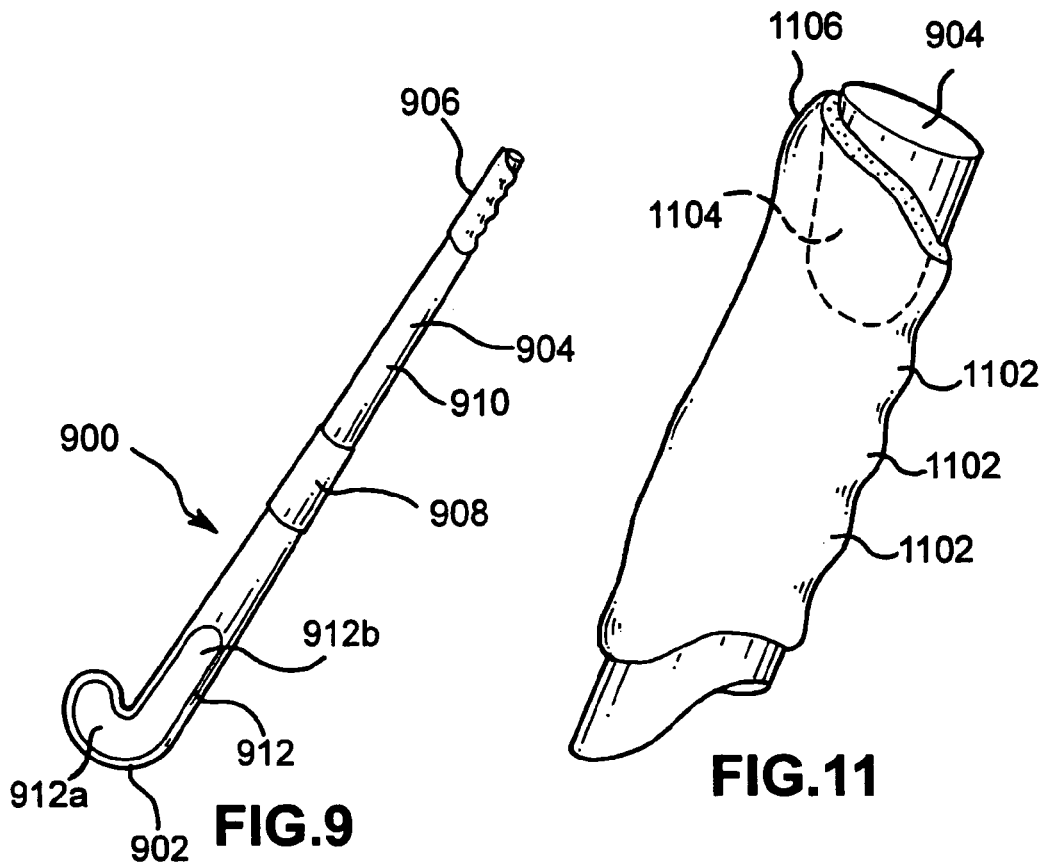
FIG.9
FIG.11
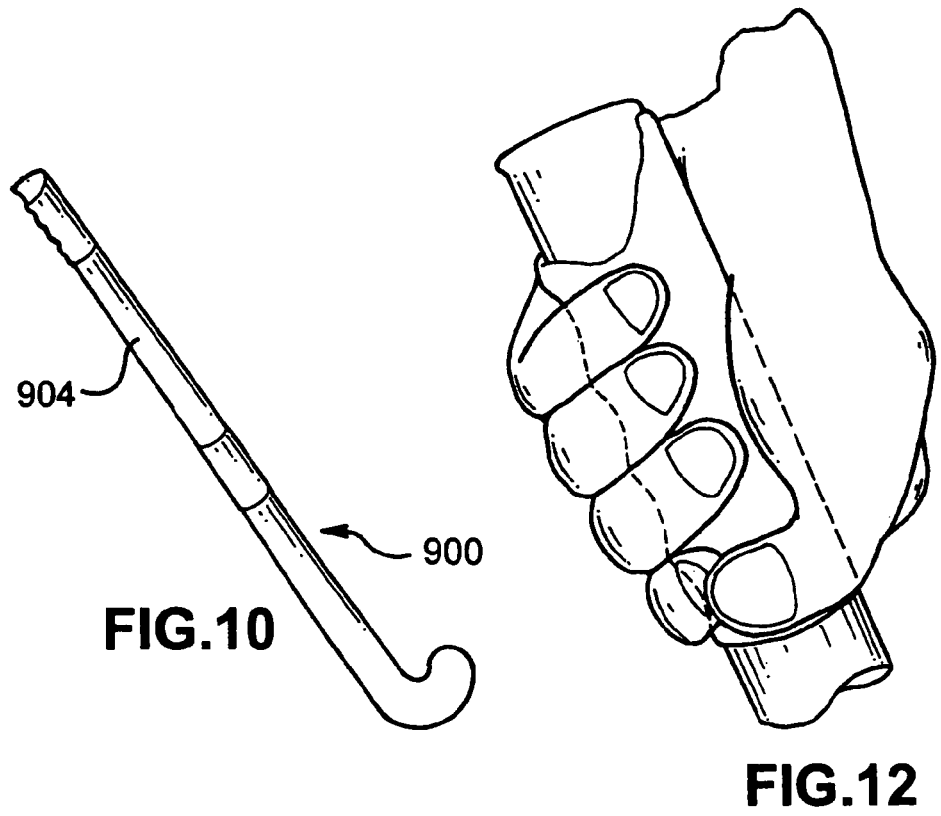
FIG.10
FIG.12

SPORTS EQUIPMENT HANDLE

This is a continuation of U.S. patent application Ser. No. 10/274,388, filed Oct. 21, 2002, now U.S. Pat. No. 6,960,144, which is a divisional of U.S. patent application Ser. No. 09/706,831, filed Nov. 7, 2000, now U.S. Pat. No. 6,500,079, both of which are herein incorporated by reference in their entirety.

BACKGROUND

1. Field of the Invention

The present invention relates generally to sports equipment, and more particularly, to the handles, hand grips, and shafts of sports equipment.

2. Background of the Invention

Several types of sports equipment incorporate a handle by which players hold and control the equipment. Familiar examples of sports equipment with handles include tennis racquets, golf clubs, baseball bats, hockey sticks, and lacrosse sticks. Among these different types of sports equipment, the handles generally fall under two categories, characterized by the extent to which a player must change hand placement. The first type of handle accommodates a limited number of hand placements and usually involves a sport in which a player places his hands in the same general location each time the equipment is used, as is the case with tennis and golf. In addition, the player usually has ample time to place his hands in preparation for using the sports equipment, especially for sports such as softball and golf. Typically, this first type of handle consists of a shaft fitted with a grip located away from the operational portion of the sports equipment, such as on tennis racquets, softball bats, and golf clubs. This first type of handle is referred to herein as a fixed hand placement handle.

The second type of handle, referred to herein as a variable hand placement handle, accommodates multiple combinations of hand placement, generally positioned over a larger area. A player using a variable hand placement handle constantly moves his hands along the handle in multiple positions. Examples of these variable hand placement handles include field hockey sticks, ice hockey sticks, and lacrosse sticks.

Typically, manufacturers design variable hand placement handles as a shaft without a grip. Providing a shaft without a grip makes manufacture easier and simplifies compliance with the rules governing sports equipment design. In addition, manufacturers are hesitant to add a specially located grip on the shaft of a variable hand placement handle because, although the grip may enhance control of the stick in executing some skills, the grip may actually hinder control in executing other skills that involve sliding or quick movement of hands along portions of the handle.

Nevertheless, some variable hand placement handles include a grip along a length of a shaft. For instance, some field hockey sticks include a grip extending half-way down the shaft, covering the area on which a player grips the stick with multiple hand combinations. Although the grips may provide a more tacky surface than the shaft material, the grips typically are basic leather or synthetic straps wrapped around the shaft, without regard to the ways in which a player's hands cooperate with the shaft. In addition, because of the manner by which they are attached (e.g., using ordinary adhesives), the grips do not move in unison with the shaft.

The present invention and the following discussion is directed to this second type of sports equipment handle, i.e., the variable hand placement handle.

In executing game skills, players must be able to grip and control the sports equipment. In some sports, such as hockey and lacrosse, this control is referred to as "stick handling." Effective stick handling requires a player to constantly reposition his hands along the sports equipment handle to move the operational portion of the sports equipment. The "operational portion," e.g., the head of a lacrosse stick or the blade of a hockey stick, refers to the part or parts of the sports equipment that is/are controlled by the handle. As used herein, "stick" refers to the sports equipment as a whole, including the operational portion. "Handle" refers to the part of the sports equipment on which a player's hand(s) is/are placed, which does not include the operational portion. The handle is comprised of a shaft and possibly provisions to improve a player's grip. A "shaft" is therefore a component of the handle.

For effective stick handling, each hand placement enables the player to impart force and torque on the sports equipment to effect a desired motion, e.g., throwing or striking a ball. In addition, in competitive situations, the player must quickly change hand placements and grips to react to and outplay his opponent. Thus, between the execution of consecutive skills, a player must release or slide one of his hands, move it to a new position, and re-grip the handle with a strong hold.

With reference to the variable hand placement handles, an example of this constant hand repositioning is a lacrosse player who scoops a ground ball, cradles the ball while running, and then throws the ball. In chasing the ground ball, the player typically grabs the lacrosse stick handle at or near its end with one hand (referred to herein as the "lower hand") and at or near its midpoint with the other hand (referred to herein as the "upper hand"), and extends the lacrosse stick out in front while running or bending down toward the ground. Once the ball is scooped up and in the pocket of the lacrosse stick head, the player pulls the lacrosse stick toward his body and simultaneously repositions one or both hands, often grabbing the handle with the upper hand just under the throat portion of the lacrosse stick head. While running and cradling the ball, the player may release the lower hand from the bottom of the handle and cradle the stick with the upper hand near the throat portion. Then, when preparing to throw, the player re-grips the bottom end of the handle and cocks the stick back with both hands. In completing the throwing motion, as the player moves his upper hand forward and lower hand back, the upper hand on the throat area slides down the shaft toward the lower hand. Throughout the throwing and follow-through motions, the lower hand tightly grips the shaft near its end to maintain control and accuracy. Thus, in the course of executing three consecutive game skills, the player quickly repositions his hands multiple times.

The ability to quickly reposition hand placement without losing control of the handle requires a player to make subtle adjustments in hand gripping force. A strong gripping force is required to hold and cock the stick, especially for the lower hand. An intermediate gripping force is required to slide a hand along the shaft without releasing the handle entirely. Such rapid grip adjustments are sometimes difficult to execute on conventional variable hand placement handles, which tend to have largely uniform surfaces that do not cooperate with a player's hand. In addition, factoring in the effects of fatigue, perspiration, cold temperatures, and inclement weather, it is easy to see why players often lose a firm grip on sports equipment.

In addition, some sports such as lacrosse and ice hockey require the use of protective gloves that further frustrate a player's firm grip on the sports equipment shaft. Although these gloves protect the outside of a player's hand, the layer of material between the shaft and the player's palm and fingers, no matter how tacky, reduces the player's feel for the sports equipment. Additionally, moisture from, for example, inclement weather makes firm gripping difficult.

To improve the grip and padding characteristics of the variable hand placement handles, players sometimes tape the shafts with gauze tape, Touma Grip™, or similar grip materials. Although these minor adjustments may approximate a grip, it is difficult to build shapes out of the tape that complement finger placement and/or that increase the diameter of the handle to aid a player in using the required gripping force. Furthermore, the tape rarely adheres well to the shaft, tends to slide, and does not move in unison with the shaft. Indeed, the tape is extremely susceptible to wearing, tattering, and falling off. Thus, players must constantly remove and replace the tape.

SUMMARY OF THE INVENTION

The present invention is a variable hand placement sports equipment handle having overlays that improve stick handling. In a preferred embodiment, the primary components of the handle include a shaft and at least one overlay attached to the shaft. The overlays are specially located and structured to provide the shaft with structural and tactile features that correspond to and accommodate the way in which a player moves his hands along the shaft and grips the shaft. The structural and tactile features are located on the shaft to enhance a player's control of the shaft when performing various skills.

The overlays are preferably made of material that is soft, pliable, deformable, and tacky in places, so as to provide a player with a better hold on the handle. The material is tacky where needed to increase grip friction and is soft, pliable, and deformable to provide cushioning and shock absorption, which alleviate stress and injury caused by the vibration of the stick and contact between the shaft and players' body parts.

In a first preferred embodiment of the present invention, the sports equipment handle is a lacrosse stick handle with an overlay applied in the area of the juncture between the lacrosse stick handle and the lacrosse stick head. Applied in the area of the juncture means that the location of the overlay relates to the juncture in one of four ways: 1) the entire overlay is disposed within a portion of the head (e.g., the throat of the head); 2) a portion of the overlay is disposed within of a portion of the head; 3) the overlay abuts the head at the juncture; or 4) the overlay is axially spaced from the juncture. The overlay applied in the area of the juncture improves the grip of a player's upper hand yet is non-tacky so as not to impede a player's hand from sliding down the shaft. An additional overlay is applied proximate to the end of the lacrosse stick handle opposite the lacrosse stick head. This additional overlay is tacky and oversized to improve the grip of a player's lower hand.

In a first alternate implementation of the first preferred embodiment, the overlay applied proximate to the end of the lacrosse stick handle has a conical shape that assists a player in gripping the end of the handle.

In a second alternate implementation of the first preferred embodiment, the sports equipment handle is a lacrosse stick handle with a continuous overlay applied to the entire length of the lacrosse stick shaft. The overlay is preferably structured with ribs and grooves to increase grip friction and resist the twisting of the shaft, while also enhancing control of the head and, thereby, the movement of the shaft and head as one unit.

In a third alternate implementation of the first preferred embodiment, the sports equipment handle is a lacrosse stick having discrete overlay ribs that extend a length of the lacrosse stick shaft, but do not cover the entire surface area of the shaft within that length.

In a fourth alternate implementation of the first preferred embodiment of the present invention, the sports equipment handle is a lacrosse stick having a base overlay covering the entire surface area of the lacrosse stick shaft and having discrete overlay ribs on top of the base overlay.

In a second preferred embodiment, the sports equipment handle is a hockey stick with at least one overlay that has indentations to receive a player's hand and improve the hold by that hand.

In a third preferred embodiment, the sports equipment handle is a field hockey stick with at least one overlay proximate to the end of the shaft that has indentations to receive a player's hand and improve the hold by that hand. In a further aspect, the field hockey stick preferably includes an overlay on a lower hand position below the first overlay. In another aspect, the field hockey stick preferably includes another overlay on the head portion of the field hockey stick. Depending on its material, composition, and/or thickness, this operational portion overlay dampens ball impacts, reduces vibration, and provides a desired rebound effect when hitting a ball.

Accordingly, an object of the invention is to provide an overlay on a variable hand placement sports equipment handle that improves a player's hold on the handle.

Another object of the present invention is to provide a sports equipment handle that improves a player's hold on the handle for various hand placements.

Another object of the present invention is to provide a sports equipment handle that increases grip friction between the handle and a player's hand or glove.

Another object of the present invention is to provide a comfortable sports equipment handle that absorbs impact and shock, and helps to prevent a player's losing hold of the handle.

Another object of the present invention is to assist with ball control on the hitting and receiving area of sports equipment shafts such as field hockey sticks.

These and other objects and advantages of the present invention are described in greater detail in the detailed description of the invention, and the appended drawings. Additional features and advantages of the invention will be set forth in the description that follows, will be apparent from the description, or may be learned by practicing the invention.

DESCRIPTION OF THE DRAWINGS

FIG. 1d is a schematic diagram of a front view of a lacrosse stick having an upper overlay and a specially structured lower overlay, according to an option of the first preferred embodiment of the present invention.

FIG. 1e is a schematic diagram showing a side view of the lacrosse stick of FIG. 1d.

FIG. 1f is a schematic diagram showing a back view of the lacrosse stick of FIG. 1d.

FIG. 1g is a schematic diagram showing different axial positions of an overlay, according to the first preferred embodiment of the present invention.

FIGS. 1h and 1i are schematic diagrams showing different radial positions of an overlay, according to the first preferred embodiment of the present invention.

FIG. 2a is a schematic diagram of a portion of a lacrosse stick having a conical shaped overlay, according to a first alternate implementation of the first preferred embodiment of the present invention.

FIG. 2b is a schematic diagram of the back of a conical shaped overlay provided by an end cap, according to an option of the first alternate implementation of the first preferred embodiment of the present invention.

FIG. 2c is a schematic diagram of a side view of the conical shaped overlay shown in FIG. 2b.

FIG. 5 is a schematic diagram of a lacrosse stick having discrete overlay ribs that extend a length of the lacrosse stick handle, according to a third alternate implementation of the first preferred embodiment of the present invention.

FIG. 6a is an enlarged view of the lower portion of the shaft of FIG. 5, with a view of cross-section A-A.

FIG. 6b is a schematic diagram of a rib attached to a shaft by an interference fit, according to an option of the third alternate implementation of the first preferred embodiment of the present invention.

FIG. 9 is a schematic diagram of a field hockey stick, according to a third preferred embodiment of the present invention.

FIG. 10 is a schematic diagram of a back view (the non-playing side) of the field hockey stick shown in FIG. 9.

FIG. 11 is a schematic diagram of an enlarged view of the overlay disposed near the end of the field hockey stick shown in FIG. 9.

FIG. 12 is a schematic diagram of the overlay shown in FIG. 11 with a hand placed on the overlay.

DETAILED DESCRIPTION OF THE INVENTION

The present invention is a variable hand placement sports equipment handle having overlays that improve stick handling. The overlays are specially located and structured to provide the shaft with structural and tactile features that correspond to the way in which a player moves his hands along the shaft and grips the shaft. The structural and tactile features are located on the shaft to enhance a player's control of the shaft when performing various skills with the operational portion of the sports equipment.

Figure 1C:
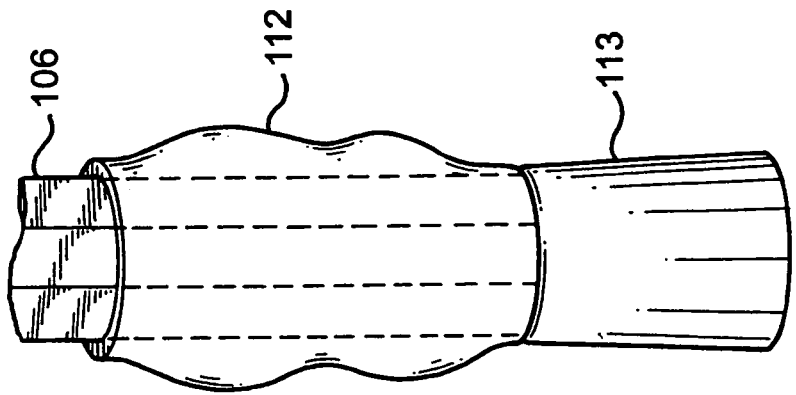
FIG. 1c is a schematic diagram of the fully assembled shaft, overlay, and end cap shown in FIG. 1b.
Figure 1B:
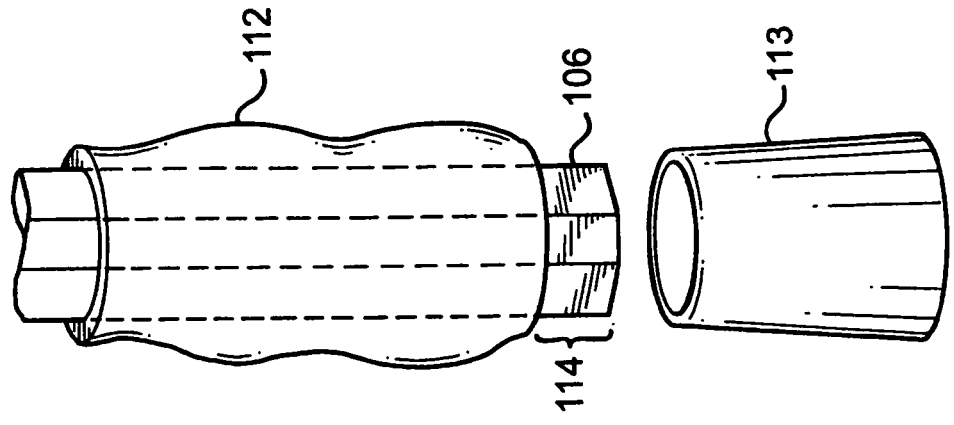
FIG. 1b is a schematic diagram of a shaft and an indented overlay according to an option of the first preferred embodiment of the present invention, in which the shaft has been cut and the indented overlay has been trimmed back to receive an end cap.
Figure 1A:
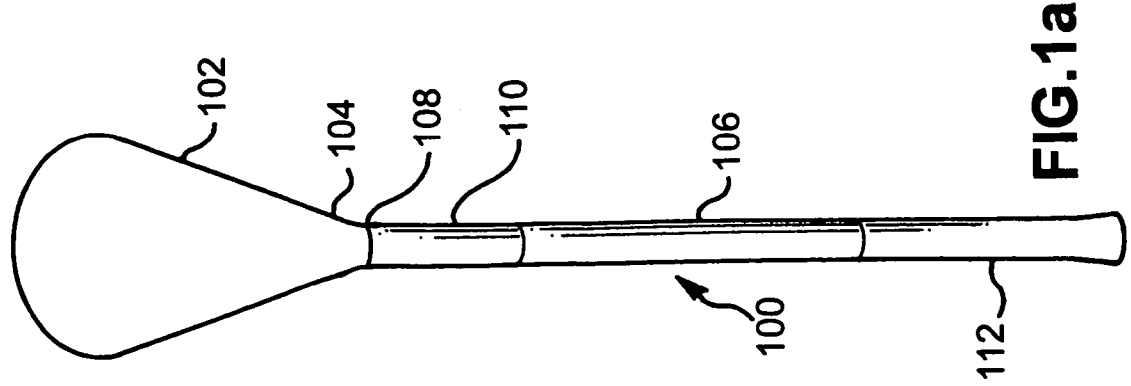
FIG. 1a is a schematic diagram of a lacrosse stick according to a first preferred embodiment of the present invention.

FIG. 1a illustrates a first preferred embodiment of the present invention for a lacrosse stick. This preferred embodiment of the present invention applies equally well to men's lacrosse sticks, to women's lacrosse sticks, to sticks for players of all sizes and ages, to sticks used in competition lacrosse (e.g., professional, club, and box lacrosse, and lacrosse governed in whole or in part by NCAA or U.S. Women's Lacrosse Association rules), and to sticks used in non-competition lacrosse (e.g., recreational and instructional lacrosse sticks used in physical education classes). In each application, the present invention is adaptable to provide unique advantages for different types of players. For example, for women and youth players, the present invention can provide cushioning for increased safety. As another example, for men's lacrosse sticks, the present invention can provide improved grip and feel.

In this first preferred embodiment, the lacrosse stick 100 includes a generally V-shaped head 102 (the operational portion) having a throat portion 104, a shaft 106 attached to throat portion 104 at a juncture 108, and at least one overlay 110 or 112 applied to lacrosse stick 100. Shaft 106 is made of wood, metal, or composite material, and of a generally round shape, perhaps octagonal or oval. The typical features of a lacrosse stick are all shown generally in Tucker et al., U.S. Pat. No. 3,507,495 and Tucker et al., U.S. Pat. No. 5,566,947, which are both incorporated by reference herein.

Overlays 110 and 112 are strategically located to correspond to the areas in which most players place their hands to use the lacrosse stick. These areas are generally on or near both ends of shaft 106, with at least a portion of the overlays proximate to the ends of shaft 106. As used herein, "proximate" means that the overlays can be located from the literal end of the shaft, to a position on the shaft at which most players place their hands, and even somewhat beyond that position as well.

Overlay 110 is applied in the area of juncture 108 and can be applied to shaft 106, to a portion of head 102, or to both. As shown in FIG. 1g, overlay 110 can assume one of four different axial positions relative to juncture 108: 1) overlay 110 can be disposed within of a portion of head 102 as shown in position 151, in other words, the entire axial length of the overlay is contained within a portion of head 102; 2) a portion of overlay 110 can be disposed within a portion of head 102 as shown in position 152; 3) overlay 110 can abut head 102 at juncture 108 as shown in position 153; or 4) overlay 110 can be axially spaced from juncture 108 as shown in position 154.

In addition to these different axial positions, the relative radial location of overlay 110 can vary as well. Head 102 and, specifically, throat portion 104 are disposed radially outward of shaft 106. As shown in FIG. 1h, overlay 110 is disposed radially between shaft 106 and throat portion 104. Positioning overlay 110 between shaft 106 and head 102 can assist in securing shaft 106 to head 102 by providing a tight interference fit. As shown in FIG. 1i, overlay 110 can also be disposed radially outward of throat portion 104 of head 102. In this position, overlay 110 can also contribute to the connection between shaft 106 and head 102, and can also provide a smoother transitioning surface from shaft 106 to head 102. As used herein, an overlay is "attached" to a shaft when the overlay is directly applied to the shaft or when the overlay is applied to a structure that is disposed radially inward or outward of the shaft, such as the throat portion in FIG. 1i.

Returning to the representative embodiment shown in FIG. 1a, overlay 110 is applied such that it abuts head 102 at juncture 108, where a player would grip the handle with her upper hand to execute such skills as catching, cradling, and throwing. Overlay 110 is preferably contoured to improve grip, yet is non-tacky so as not to impede the sliding of a player's hand. Alternatively, overlay 110 is made of several layers of overlay material to build up contours such as ribs and grooves (described in more detail below). At this location, the improved grip and increased cross-sectional area of overlay 110 reduce the torque on a player's arm, especially when holding the stick handle with one hand, e.g., when cradling the ball with one hand (a common practice in men's lacrosse).

Similarly, overlay 112 is applied to a region proximate to the end of the handle opposite head 104. At this location, a player would grip the handle with her lower hand to execute such skills as catching and throwing, but would also execute such skills as raising the stick above her head to avoid opponents, or extending the stick out in front of herself to scoop ground balls or run in the open field. The increased grip friction and cross-sectional area of the handle reduce torque on a player's arm.

The axial lengths of overlays 110 and 112 are at least as long as a typical player's hand width. Overlay 112 also preferably encloses the end of shaft 106 to eliminate the need for an end cap. Optionally, overlay 112 is much longer than a typical player's hand width, e.g., approximately 1 foot long or longer. This additional length provides enough grip area for players who cut off the bottom of the handle to customize the length and handling of the lacrosse stick (an occasional practice of children players and box lacrosse players). In such a case, as shown in FIGS. 1b and 1c, the present invention would include an end cap 113 that joins overlay 112 at the end of shaft 106 to provide a complete, enclosed final product. Preferably, in this situation, when shaft 106 is cut, overlay 112 is trimmed back to leave an area 114 for receiving end cap 113 (as shown in FIG. 1b). FIG. 1c shows end cap 113 abutting overlay 112 and covering area 114.

In addition to accommodating the size and placement of players' hands, a further advantage of the overlays is the ability to create interesting and pleasing shapes that increase the overall aesthetic value of shaft 106 and lacrosse stick 100.

In addition to being strategically located, overlays 110 and 112 are specially structured to improve the player's hold on the lacrosse stick handle. Preferably, this structure is shaped to conform to a player's hand, for example, with finger indentations, ribs, grooves, or an overall hourglass shape. The structure also preferably includes varying cross-sectional areas that prevent a player's hand from sliding over the end of the overlay and off of the shaft. For example, to improve the gripping of the lacrosse stick at the end opposite to head 102, the cross-sectional area of overlay 112 could increase toward the end of the lacrosse stick handle. The resulting substantially conical-shaped overlay helps prevent the player's hand from slipping off the end of the handle. The conical shape also provides the player's hand with more leverage over the shaft, allowing the player to impart increased torque on the lacrosse stick and to achieve better overall control. Optionally, overlay 110 could include grooves below head 102 to provide enough grip for a player to control the stick handle while holding the stick handle with one hand and dodging opposing players, yet still allow the player's hand to slide.

FIGS. 1d, 1e, and 1f illustrate a lacrosse stick 113 having an upper overlay 114 and a specially structured lower overlay 116 that includes features that help a player to grasp stick 113. FIGS. 1d, 1e, and 1f are front, side, and back views, respectively, of lacrosse stick 113. A series of protrusions 118 act as finger grips. These protrusions 118 are disposed between respective fingers of the player, improving comfort and grip. Protrusions 118 are disposed on the back of stick 113 to accommodate the manner in which a player grabs shaft 106. A raised portion 120 helps to prevent stick 113 from slipping axially away, out of the player's hand. Protrusions 118 and raised portion 120 match the natural contours of a player's hand and improve grip and comfort.

An important aspect of the present invention is the relative thicknesses of overlays 110 and 112, providing different cross-sectional areas of shaft 106 in strategic locations. For example, overlay 110 could be thinner to produce a smaller cross-sectional area, thereby allowing a player's hand to more easily slide over it (e.g., during a throwing motion). Likewise, overlay 112 could be thicker to produce a larger cross-sectional area, thereby providing a player with increased leverage, greater torque, and enhanced control over stick 100. These performance characteristics would be especially beneficial to players that frequently play with one hand on shaft 106.

To improve a player's hold on shaft 106, the material of overlay 110 and 112 is preferably soft, pliable, deformable, and tacky. "Tacky," as used herein, means a surface providing friction with a player's hand or glove greater than the friction that would be provided by the shaft itself. "Deformable," as used herein, means able to change shape, e.g., to reduce thickness. The preferred functions of the overlay material include increased grip (friction between the overlay and a player's hand or glove), and shock absorption. Examples of preferred materials satisfying these characteristics and functions include elastomers and rubbers. For example, preferred materials include thermoplastic elastomers (TPEs) such as thermoplastic urethane (TPU), styrene block copolymers, thermoplastic olefins (TPO), thermoplastic vulcanizates (TPV), melt-processible rubber such as Alcryn™ from Advanced Polymer Alloys, polyether block amides such as Pebax™ from Elf Atochem, copolyesters, copolyamides, and other TPEs that are soft, pliable, deformable and/or tacky. In addition to lacrosse stick handles, the preferred overlay materials apply also to other embodiments of variable hand placement sports equipment handles having overlays, as described below.

As a specific example, Alcryn™ melt-processible rubber is preferred for overlay 112 because it is durable and provides increased tack and grip friction between overlay 112 and a player's hand or glove, while still providing some degree of cushioning. Alcryn™ that is modified to obtain polymers of greater hardness and reduced tack is suitable for overlay 110 since it is durable and offers some degree of cushioning.

FIG. 2a illustrates a first alternate implementation of the first preferred embodiment of the present invention for a men's lacrosse stick handle, in which overlay 112 preferably has a more pronounced conical shape than a women's stick handle, i.e., the cross-sectional area of overlay 112 increases at a greater rate and reaches a greater cross-sectional area at the handle end than on a women's handle. For instance, overlay 112 on a men's stick handle could be 6 inches long, increasing in cross-sectional area from 1.77 square inches (corresponding to a 1.5 inch diameter) to 4.91 square inches (corresponding to a 2.5 inch diameter) at the end of the shaft. By contrast, overlay 112 on a women's stick handle could be 5 inches long, increasing more gradually in cross-sectional area from 1.77 square inches to 3.14 square inches (corresponding to a 2 inch diameter). The exact dimensions for each application vary according to the needs of a particular type of player and according to limits set by competitive rules. The wider end and the more pronounced conical shape of overlay 112 are better suited for men's larger hands and for the men's more frequent one-handed style of play. Overall, the more pronounced conical shape assists a men's player in gripping the end of the stick and not allowing the stick handle to slip free.

The pronounced conical shape of this first alternate embodiment of the first preferred embodiment of the present invention can be achieved using an end cap that forms overlay 112. As shown in FIGS. 2b and 2c, end cap 200 fits onto shaft 106 to provide a conical shape for overlay 112. In this representative embodiment, end cap 200 has a female end 208, which receives shaft 106, and a butt end 210. End cap 200 has rounded protrusions 202 that increase the cross-sectional area of end cap 200 to create the conical shape, as shown in FIG. 2b. Furthermore, end cap 200 has a back protrusion 204 that extends the material of end cap 200 a farther distance radially away from shaft 106 and further increases the cross-sectional area of end cap 200.

Preferably, as shown in FIG. 2c, the plane 250 of the face of butt end 210 is not perpendicular to the axis 251 of shaft 106. This configuration, along with protrusion 204, creates a comfortable structure against which the heel of a player's hand can rest. Also preferably, as shown in FIG. 2c, the plane 252 of the face of female end 208 is not perpendicular to the axis 251 of shaft 106. This configuration creates a joint between end cap 200 and shaft 106 that is oriented to match the direction in which a player's finger wraps around shaft 106. The ridge of end cap 200 at this joint provides another point of resistance that improves the player's grip. Optionally, plane 252 of the face of female end 208 could be substantially perpendicular to axis 251 of shaft 106 to simplify manufacturing of end cap 208 and to provide a stronger bond between end cap 200 and shaft 106 by increasing the surface area joining end cap 200 to shaft 106. As used herein with reference to perpendicular and parallel, "substantially" means ±5°.

As shown in FIGS. 2b and 2c, end cap 200 also preferably has a grooved area 204 to increase grip friction. Grooved area 204 has ribs 205 and grooves 206. Preferably, ribs 205 and grooves 206 are formed substantially parallel to axis 251 of shaft 106 as shown in FIG. 2b. However, ribs 205 and grooves 206 could also be formed in other alignments, such as substantially perpendicular to axis 251, diagonal to axis 251, and random or patterned curved lines.

Figure 3:
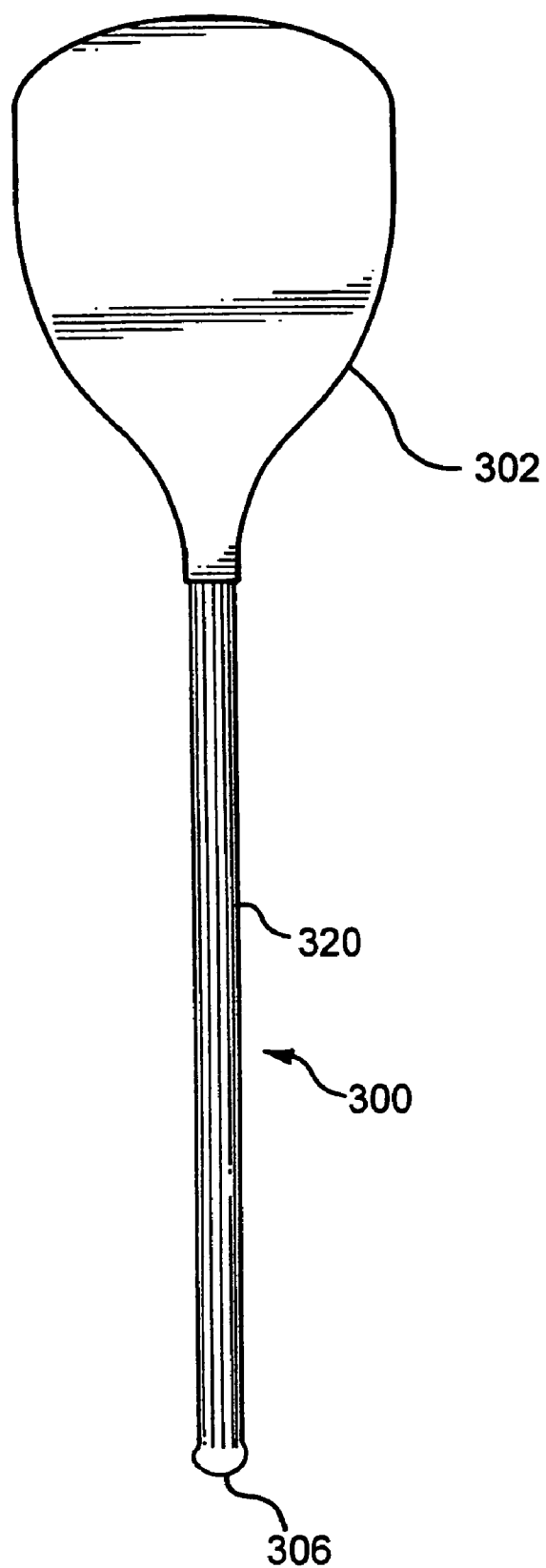
FIG. 3 is a schematic diagram of a lacrosse stick, according to a second alternate implementation of the first preferred embodiment of the present invention.

FIG. 3 illustrates a second alternate implementation of the first preferred embodiment of the present invention, as specifically applied to a goalie lacrosse stick 300. The design requirements of a goalie stick and the use of the goalie stick differ somewhat from the sticks used in other lacrosse player positions. Most notably, the goalie stick is primarily used for defensive purposes, to block balls from entering the goal. Although the goalie's ability to throw accurately is important, the principal focus of the stick design, as evident by the large head 302, is to provide an easily maneuverable, wide stopping area. In positioning the stopping area (head 302), goalies use multiple hand placements along shaft 306. The hand placements depend largely on the speed and direction of an approaching ball. Therefore, isolated overlays, such as overlays 110 and 112 of FIG. 1a, may not accommodate all of the hand placements that different goalies require and may not provide the same reduction in torque when quickly moving the larger goalie head.

Figure 4:
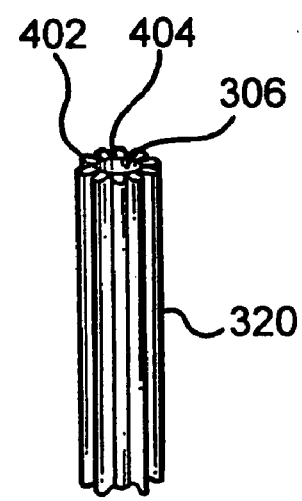
FIG. 4 is a schematic diagram of an enlarged view of a portion of the overlay on the stick shown in FIG. 3.

As shown in FIGS. 3 and 4, the present invention provides an overlay that is specially suited for a goalie's needs. Overlay 320 extends the entire length of shaft 306 to improve a player's hold on the stick for hand placement along any portion of shaft 306. In relation to the first preferred embodiment (FIG. 1a), overlay 320 of this second alternate implementation can be viewed as the two overlays 110 and 112 of FIG. 1a with a third overlay in between, joining the three overlays to form a substantially continuous overlay that completely encases shaft 306. As used herein, extending the entire length of the shaft and completely encasing the shaft mean that the overlay covers either the shaft from one literal end to the other literal end or that the overlay is proximate to the ends of the shaft but does not cover the literal ends of the shaft, in which case the shaft may not be covered where it is disposed radially inward of the head. In addition, in covering the entire length of the shaft, the radial location of the overlay in relation to the head can vary as described above in connection with FIGS. 1h and 1i.

Preferably, as shown in FIGS. 3 and 4, overlay 320 includes ribs 402 and grooves 404 that enhance grip, help to prevent the shaft from twisting in a player's hand, and, because of the greater circumference they provide, increase the degree to which the handle and head move as one unit. This latter benefit is the key to good goalie play. Ribs 402 and grooves 404 are preferably formed in straight longitudinal lines along shaft 306.

Although FIGS. 3 and 4 illustrate this implementation in the context of goalie sticks, the structures and functions of this implementation are not limited to goalie sticks and can be applied to other types of lacrosse sticks to obtain the same or similar advantages. Indeed, an overlay that extends the entire length of a shaft, such as overlay 320, provides advantages to all types of lacrosse sticks. For example, as a preferred embodiment, an overlay could cover the entire length of a shaft to completely encase the shaft and provide an end cap on the shaft. The overlay could be smooth or could have ribs. By encasing the entire length of the shaft, the shaft is better protected and can be constructed of a thinner wall thickness. This construction affords a substantial weight savings, which is a significant benefit to any lacrosse stick. Optionally, instead of completely encasing the shaft, the overlay could encase the shaft to a point proximate to the butt end of the shaft (the end opposite the operational portion), where the overlay could meet an end cap attached to the butt end of the shaft.

FIG. 5 illustrates a third alternate implementation of the first preferred embodiment of the present invention, in which a lacrosse stick 500 has an overlay 502 that extends a length of shaft 504, but does not cover the entire surface area of shaft 504 within that length (i.e., overlay 502 does not encase shaft 504 within that length). Although FIG. 5 shows overlay 502 extending the entire length of shaft 504, overlay 502 could extend only particular lengths of shaft 504, for example, a length near head 510.

As best shown in the enlarged view of FIG. 6a, overlay 502 is a rib attached to shaft 504. FIG. 6a shows the lower portion of shaft 504 of FIG. 5 with a view of cross-section A-A. Overlay 502 is made of any of the materials described above for overlays 110 and 112 of FIG. 1a, while shaft 504 is made of conventional materials, such as wood or metal. For example, rib 502 could be an elastomer applied to a shaft 504 made of aluminum.

Optionally, as shown in FIG. 6b, overlay 502 is attached to shaft 504 using an interference fit. For example, shaft 504 could have a dovetail slot 507 into which an elastomeric rib is forced. The shape of overlay 502 matches the shape of dovetail slot 507. Preferably, overlay 502 is slightly larger than slot 507 so that overlay 502 must be compressed to fit inside slot 507. This compression creates an interference fit that strongly bonds overlay 502 and shaft 504 such that they move in unison. Although this interference fit is described here in the context of rib overlays on a lacrosse stick, this optional embodiment applies equally well to any overlay applied to a sports equipment handle.

In addition to providing a tacky gripping surface, overlay 502 protrudes from shaft 504 to provide a structure against which a player's hand can apply torque around the axis of shaft 504. The applied torque increases a player's control of the stick and resists unwanted twisting of shaft 504. As an added benefit, overlay 502 provides a tactile cue of the orientation of the shaft. By feeling overlay 502, a player knows in which direction the head is facing. Therefore, a player can correctly position the head of the stick without looking at the stick.

As shown in FIGS. 5 and 6, more than one discrete overlay can be applied to shaft 504. Preferably, shaft 504 contains three discrete overlays 502, 506, and 508, spaced equally around the perimeter of shaft 504. As with a single overlay, overlays 502, 506, and 508 are located to provide a player with a feel for the orientation of lacrosse stick 500. For example, overlay 506 could be located on a vertical line drawn through the middle of head 510, to indicate to a player the direction head 510 is facing.

FIGS. 5 and 6a illustrate additional overlays applied to shaft 504 at a location of more frequent hand placement. Overlays 512 are latitudinal ribs applied to shaft 504 near its end opposite the operational portion (head 510). Overlays 512 are distinct ribs of material applied around the perimeter of shaft 504. Overlays 512 are made of any material described above for overlays 110 and 112 of FIG. 1a. The area 514 between overlays 512 is the conventional material of shaft 504, such as metal or wood.

Overlays 512 provide a player with additional tacky surfaces for better grip at locations of more frequent hand placement, e.g., at the upper and lower ends of shaft 504. In addition, overlays 512 provide a structure against which a player's hand can apply a force along the axis of shaft 504. This applied force increases a player's control of the stick and prevents shaft 504 from sliding out the player's hand. The individually placed ribs of overlays 512 also provide a tactile indication of the correct area of hand placement and provide areas 514 in which a player's fingers can securely hold shaft 504. Although FIGS. 5 and 6a show overlays 512 at the end of shaft 504 opposite head 510, this preferred embodiment also includes overlays of a type similar to overlays 512, applied at other locations along shaft 504, for example, at another location of frequent hand placement just below head 510.

The rib structures of overlays 502, 506, 508, and 512 offer several advantages. The ribs are made of material softer than shaft 504, providing cushioning during such motions as throwing, catching, and checking. The cushioning is especially beneficial when players' fingers are struck and pinched against shaft 504 by other hard surfaces, such as opposing players' sticks. The ribs also help to keep a player's fingers off of the surface of shaft 504. This feature is advantageous in cold weather, when a metal shaft can chill and stiffen a player's hands, and thereby compromise the player's skills. Applying ribs the length of shaft 504 and at particular locations of frequent hand placement also helps to dampen vibration of the entire stick 510, thereby increasing the player's comfort and control. Finally, as described above, the rib structures provide improved grip and additional surfaces against which to apply torque and force.

Although FIGS. 5 and 6a depict overlays 502, 506, 508, and 512 as ribs of constant thickness, the thickness of the ribs could vary. As used here, thickness means the distance that the overlays protrude from shaft 504, or distance T in FIG. 6a. For example, the thickness could taper such that overlays 502, 506, and 508 are at their greatest thicknesses at the end of shaft 504 opposite head 510, and reduce in thickness down to their smallest thicknesses at the end of shaft 504 near head 510. The thicker ribs at the end of shaft 504 opposite head 510 provide an increased cross-sectional area at the butt end of stick 500 to give a player the same stick handling advantages described above for the conical shaped overlay. As another example, overlays 502, 506, 508, and 512 could have contoured indentations intended to accommodate the shape of a player's hand or fingers.

Figure 6C:
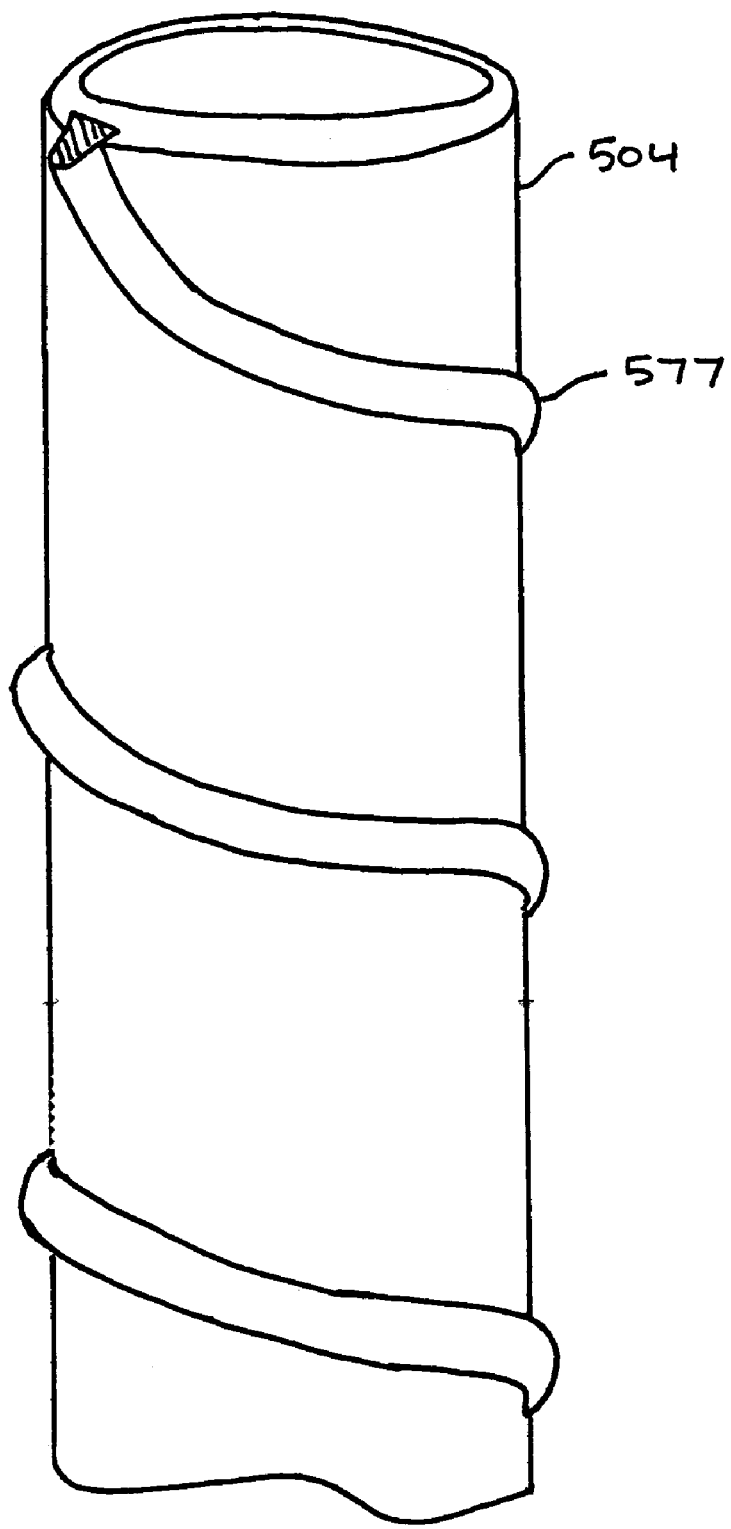
FIG. 6c is a schematic diagram of a rib applied to a shaft in a corkscrew pattern, according to an option of the third alternate implementation of the first preferred embodiment of the present invention.

In addition to variable thickness, the shape and width of overlays 502, 506, and 508 can vary. "Width" is as shown by W in FIG. 6a. Although FIGS. 5 and 6a show the ribs as having constant widths W running parallel to the axis of shaft 504, width W could vary and the ribs could run in a direction other than parallel to the axis of shaft 504. For example, in areas of more frequent hand placement, overlays 502, 506, and 508 could be wider to provide more surface area with which to contact a player's hand. As another example, width W could vary such that overlays 502, 506, and 508 are at their greatest width at the end of shaft 504 opposite head 510, and reduce in width down to their smallest width at the end of shaft 504 near head 510. As an example of running in a direction other than parallel, overlays 502, 506, and 508 could travel in a swirled pattern down the length of shaft 504, like the pattern of a barbershop pole or a corkscrew (e.g., see overlay 577 of FIG. 6c).

Figure 7:
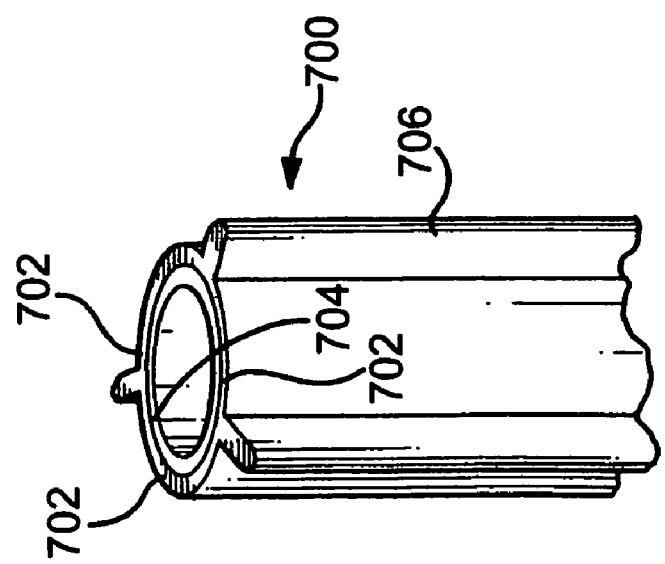
FIG. 7 is a schematic diagram of a lacrosse stick having a base overlay covering the entire surface area of the lacrosse stick handle and having discrete overlay ribs on top of the base overlay, according to a fourth alternate implementation of the first preferred embodiment of the present invention.

FIG. 7 illustrates a fourth alternate implementation of the first preferred embodiment of the present invention, in which a lacrosse stick 700 has a base overlay 702 covering an entire surface area of the lacrosse stick shaft 704, and has discrete overlays 706 on top of base overlay 702. Overlays 706 are ribs providing the same structures and functions described above for overlays 502, 506, and 508 of FIGS. 5 and 6a. Base overlay 706 provides additional performance benefits such as thermal insulation, cushioning, and dampening. Base overlay 706 also serves as a protective layer for shaft 504, reducing the likelihood of damage such as nicks and dents. Also, in the event of a severe impact that breaks shaft 704, having shaft 704 covered with base overlay 706 diminishes the possibility of exposed, sharp metal edges cutting a player.

Figure 8:
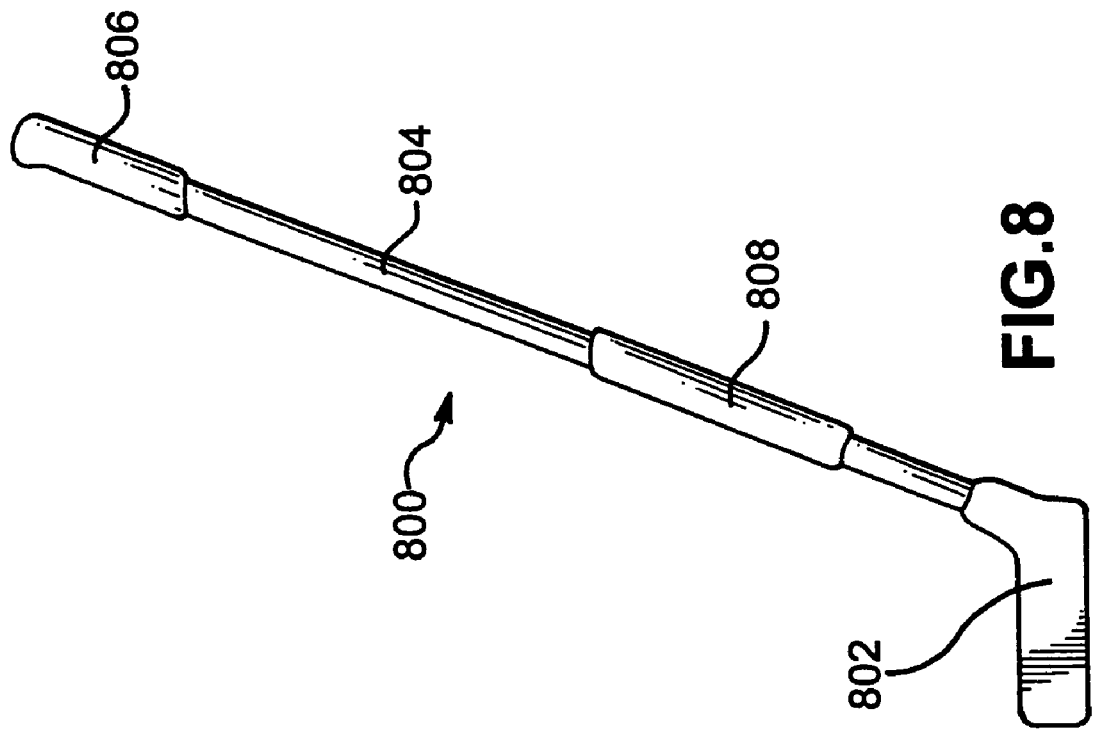
FIG. 8 is a schematic diagram of a hockey stick, according to a second preferred embodiment of the present invention.

FIG. 8 illustrates a hockey stick 800 according to a second preferred embodiment of the present invention. Hockey stick 800 has a blade 802 (the operational portion) and a shaft 804 connected to blade 802. Shaft 804 preferably includes two overlays 806 and 808. Preferably, overlay 806 is spaced from overlay 808 along the length of shaft 804. In an exemplary embodiment of the invention as shown in FIG. 8, overlay 808 is located closer to blade 802 than overlay 806. Preferably, overlay 806 is disposed proximate to the end of shaft 804 opposite blade 802 and overlay 808 is located proximate to blade 802 at a convenient gripping location. The principles of the invention disclosed in connection with FIG. 8 are equally applicable to street hockey sticks and ice hockey sticks.

FIGS. 9-12 show a field hockey stick according to a third preferred embodiment of the present invention. Field hockey stick 900 includes a curved head or toe 902 (the operational portion) and a shaft 904. Curved head 902 has a flat side (playing side) and a smooth rounded side (non-playing side). Shaft 904 can be of a uniform or variable cross-sectional area.

Field hockey stick 900 preferably includes at least one, and preferably two, overlays 906 and 908. Preferably, overlays 906 and 908 are axially spaced from one another along the length of shaft 904. Preferably, overlays 906 and 908 are located at those positions along the length of shaft 904 where players are most likely to grasp shaft 904. In the field hockey stick embodiment shown in FIGS. 9-12, overlay 906 is disposed proximate to the end of shaft 904 and overlay 908 is disposed below overlay 906 proximate to head 902. Thus, overlay 908 is disposed between head 902 and overlay 906. Field hockey stick 900 preferably includes a sliding area 910 disposed between overlay 906 and overlay 908. Sliding area 910 allows the player's hands to slide more easily between overlays 906 and 908. Optionally, conventional gripping material, such as leather or synthetic straps, can be applied to sliding area 910.

As an alternate implementation of the third preferred embodiment, field hockey stick 900 further includes an operational portion overlay 912 on the flat side of head 902. Operational portion overlay 912 provides a desired level of rebound and impact absorption to enhance ball control and reduce vibration. As an example of a desired level of rebound and impact absorption, overlay 912 could be firm in the hitting area 912a and more compressible in the flat ball-stop area 912b. As apparent to one of ordinary skill in the art, overlay 912 could be two separate overlays for hitting area 912a and ball-stop area 912b.

FIGS. 11 and 12 are enlarged views of upper overlay 906. Overlay 906 may include features that help players grasp stick 900. A series of protrusions 1102 act as finger grips. These protrusions 1102 are disposed between respective fingers of the player, and improve comfort and grip. Indentation or recess 1104 is designed to accommodate the heel of the player's hand. Finally, a raised portion 1106 helps to prevent the field hockey stick 900 from slipping axially away from the player. All of these features act to match the natural contours of a player's hand and improve grip and comfort. While the contouring features have been disclosed in connection with the field hockey embodiment, it should be kept in mind that the contouring features are equally applicable to other embodiments of the invention as well.

An important aspect of the field hockey embodiment is the relative thicknesses and materials of overlays 906, 908, and 912, and especially of areas 912a and 912b of overlay 912. Each overlay can be made of different materials and different thicknesses to provide the desired levels of cushioning and rebound. For instance, overlay 912 can be thin in hitting area 912a to provide a firm surface in the ball striking portion of head 902, which limits rebound absorption and provides solid, predictable contact. The same overlay 912 could also be thicker in ball-stop area 912b to cushion ball impacts and thereby improve a player's ability to receive and gain control over a ball. As another example, the thickness of overlay 906 could vary to produce varying degrees of cushioning. The thickness in the area of the palm of the hand could be greater to provide increased cushioning and comfort, while the thickness in the area of the fingers could be thinner to provide better grip and feel for the handle. In addition to variable thicknesses, different materials can be used in each overlay to provide desired performance characteristics.

Regarding overlay material for the field hockey stick embodiment, as an example, Alcryn™ melt-processible rubber is preferred for overlays 906 and 908 because it is durable and provides increased tack and grip friction between the overlays and a player's hand or glove, while still providing some degree of cushioning. Overlay 912 preferably consists of impact-absorbing materials that are durable and abrasion resistant, such as thermoplastic urethanes, styrene block copolymers, firmer grades of Alcryn™, thermoplastic olefins, thermoplastic vulcanizates, copolyesters, and copolyamides.

According to the preferred embodiments of the present invention, to create a unitary handle, the process of joining an overlay and shaft uses insert molding or over molding methods. Both methods produce a composite structure in which the components are strongly bonded such that they move in unison. As used herein, "unitary handle" refers to this composite structure in which the components move in unison. Insert molding is more appropriate for shaft handles having a long continuous overlay, such as on stick 300 in FIG. 3. Over molding is more suitable for overlays placed at isolated locations on a shaft, as with overlays 110 and 112 on shaft 106 in FIG. 1a.

For the insert molding method, a shaft is placed inside a mold that covers the entire surface of the shaft and creates a continuous series of interior cavities between the mold and the shaft. A melted thermoplastic or thermosetting elastomer is poured into the mold to fill the interior cavities. After cooling and solidifying, the material in the interior cavities forms a continuous overlay.

The method for over molding is similar to insert molding except that the mold forms independent interior cavities into which melted thermoplastic or thermosetting elastomer is poured. The independent interior cavities create overlays at specific, non-continuous locations around the shaft.

In addition to these molding methods, an alternative preferred embodiment of the present invention uses structural elements of the overlay and shaft to create a unitary handle. The structural elements require the overlay to be compressed and force-fitted into a cavity on the shaft. The resulting interference fit strongly bonds the overlay and shaft to provide the unitary handle. For example, as shown in FIG. 6a and described above, on a lacrosse stick with an extruded metal shaft, the outer surface of the shaft could have dovetail slots formed axially along the shaft. A pre-molded rib matching the shape of the slots, but sized slightly larger, would be compressed and forced into a slot. Once positioned in the slot, the compressed rib and shaft would bond tightly together to create the unitary handle. Optionally, instead of using a pre-molded rib, this structural fit could be combined with the molding methods such that melted thermoplastic or thermosetting elastomer is poured inside a slot and molded above the slot to form the rib.

As one of ordinary skill in the art would appreciate, the above-described embodiments are examples of preferred placements of the overlay areas on portions of a sports equipment handle. The preferred areas will vary according to the particular sports equipment and the locations on the sports equipment handle that a player is most likely to manipulate. The optimal shape and placement of the overlays will vary according to the way in which a typical player grips the sports equipment handle and applies force to the handle.

Other embodiments of the invention will be apparent to those skilled in the art from consideration of the specification and practice of the invention disclosed herein. It is intended that the specification and examples be considered as exemplary only, with a true scope and spirit of the invention being indicated by the claims.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A lacrosse stick handle comprising:
    a hollow tubular lacrosse stick shaft, the shaft having an outer surface and an axis, the shaft defining a slot substantially parallel to the shaft axis, a cross-section of the slot having a base and an opening, the cross-section taken substantially perpendicular to the shaft axis, and the base being larger than the opening; and
    a rib disposed in the slot, the rib protruding above the outer surface of the shaft, and the shaft and the rib comprising separate structures wherein the rib being moveable within and removable from the slot.

2. The lacrosse stick handle of claim 1, the shaft comprising a shape of one of generally round, octagonal, and oval.

3. The lacrosse stick handle of claim 1, the rib sized slightly larger than the cross-section of the slot such that the rib is compressed in the slot.

4. The lacrosse stick handle of claim 1, a cross-section of the rib having a base, the rib cross-section taken substantially perpendicular to the shaft axis, and the rib base being larger than the opening of the slot.

5. The lacrosse stick handle of claim 1, the rib comprising an overlay compressed into the slot.

6. The lacrosse stick handle of claim 1, the rib comprising an overlay molded into the slot.

7. The lacrosse stick handle of claim 1, the rib protruding above the outer surface of the shaft at varying distances to define indentations adapted to accommodate a player's hand.

8. The lacrosse stick handle of claim 7, a shaft cross-section of the shaft taken substantially perpendicular to the shaft axis having a generally round shape, the rib and the slot occupying only a portion of outer surface of the shaft when viewed in the shaft cross-section.

9. The lacrosse stick handle of claim 8, the rib and the slot occupying less than a quarter of the outer surface of the shaft when viewed in the shaft cross-section.

10. The lacrosse stick handle of claim 1, the rib protruding above the opening of the slot at varying distances such that the rib is tapered above the opening of the slot.

11. The lacrosse stick handle of claim 1, the shaft defining a second slot substantially parallel to the shaft axis, and the lacrosse stick handle further comprising a second rib disposed in the second slot.

12. The lacrosse stick handle of claim 1, further comprising a lacrosse head attached to the shaft.

13. The lacrosse stick handle of claim 12, the lacrosse head having a centerline when viewed from a front face view, and the slot disposed on a line on the shaft drawn through the centerline of the head to indicate a direction the head is facing.

14. The lacrosse stick handle of claim 12,
the head having a throat portion,
the shaft being attached to the throat portion,
the head being disposed radially outward of the shaft,
a juncture being defined between the end of the throat portion and the shaft, and
the rib spanning the juncture, with at least a portion of the rib disposed within the throat portion radially between the head and the shaft.

15. The lacrosse stick handle of claim 14, the throat portion defining a socket, the shaft disposed inside the socket, and the rib contacting and compressed by the socket.

16. The lacrosse stick handle of claim 14, the rib comprising a molded elastomer.

17. A lacrosse stick handle comprising:
a hollow tubular lacrosse stick shaft defining a slot in its outer surface, the slot having a longitudinal axis, a cross-section of the slot having a base and an opening, the cross-section taken substantially perpendicular to the longitudinal axis, and the base being larger than the opening; and
a rib disposed in the slot, a cross-section of the rib taken along the longitudinal axis having a width larger than the opening, the rib protruding above the outer surface of the shaft, and the shaft and the rib comprising separate structures wherein the rib being moveable within and removable from the slot.

18. The lacrosse stick handle of claim 17, the rib being compressed within the slot.

19. The lacrosse stick handle of claim 17, further comprising a lacrosse head attached to the shaft.

20. A lacrosse stick handle comprising:
a hollow tubular lacrosse stick shaft, the shaft having an outer surface and an axis, the shaft defining a slot substantially parallel to the shaft axis, a cross-section of the slot having a base and an opening, the cross-section taken substantially perpendicular to the shaft axis, and the base being larger than the opening; and
a rib disposed in the slot, the rib protruding above the outer surface of the shaft, and the shaft and the rib comprising separate structures,
wherein the rib protrudes above the opening of the slot at varying distances in a direction parallel to the shaft axis such that the rib is tapered above the opening of the slot wherein the rib being moveable within and removable from the slot.

21. A lacrosse stick handle comprising:
a hollow tubular lacrosse stick shaft, the shaft having an outer surface and an axis, the shaft defining a plurality of spaced apart slots substantially parallel to the shaft axis, a cross-section of each of the slots having a base and an opening, the cross-section taken substantially perpendicular to the shaft axis, and the base being larger than the opening;
a plurality of ribs, each disposed in a slot of the plurality of spaced apart slots and protruding above the outer surface of the shaft at varying distances such that the plurality of ribs are arranged to define contoured indentations adapted to accommodate a player's hand wherein the ribs being moveable within and removable from the slots.

* * * * *